(12) United States Patent
Narita

(10) Patent No.: US 8,970,712 B2
(45) Date of Patent: Mar. 3, 2015

(54) IMAGE SENSING APPARATUS FOR CORRECTING IMAGE DISTORTION CAUSED BY HAND SHAKE, AND CONTROL METHOD THEREOF

(75) Inventor: Yu Narita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 13/407,897

(22) Filed: Feb. 29, 2012

(65) Prior Publication Data

US 2012/0242847 A1 Sep. 27, 2012

(30) Foreign Application Priority Data

Mar. 22, 2011 (JP) ................................. 2011-062925

(51) Int. Cl.
*H04N 5/228* (2006.01)
*H04N 5/353* (2011.01)
*H04N 5/232* (2006.01)

(52) U.S. Cl.
CPC ......... *H04N 5/3532* (2013.01); *H04N 5/23254* (2013.01)
USPC ................ 348/208.99; 348/208.1; 348/208.2; 348/208.3

(58) Field of Classification Search
USPC .............................. 348/208.99, 208.1–208.7, 348/208.11–208.16; 359/354–357; 382/107
See application file for complete search history.

(56) References Cited

U.S. PATENT DOCUMENTS

| 2009/0160948 | A1* | 6/2009 | Tabuchi | ..................... 348/208.2 |
| 2010/0002088 | A1 | 1/2010 | Ohta | |
| 2010/0085436 | A1* | 4/2010 | Ohno | ......................... 348/208.1 |
| 2010/0220200 | A1* | 9/2010 | Otake | ......................... 348/208.4 |
| 2011/0037863 | A1* | 2/2011 | Mihota et al. | ............ 348/208.99 |

FOREIGN PATENT DOCUMENTS

| JP | 2006-186481 | | 7/2006 |
| JP | 2007-189602 | A | 7/2007 |
| JP | 2010-016700 | A | 1/2010 |

OTHER PUBLICATIONS

The above reference was cited in a Dec. 27, 2013 Chinese Office Action, enclosed with an English Translation, that issued in Chinese Patent Application No. 201210078556.3.

* cited by examiner

*Primary Examiner* — Yogesh Aggarwal
(74) *Attorney, Agent, or Firm* — Cowan, Liebowitz & Latman, P.C.

(57) ABSTRACT

When sensing an image using an image sensor driven by the rolling shutter method, a shake of an image sensing apparatus in the exposure period of the image sensor is detected, and the temporal characteristic of the detected shake is obtained. For the temporal characteristic of the shake, the frequency distribution of the distortion amount of an object image that is generated in the image owing to the shake is analyzed. For at least the center frequency, the temporal characteristic of the shake is compensated for to eliminate a phase shift generated when the temporal characteristic of the shake is obtained. An object image distortion arising from the shake for each line of the image sensor is corrected using a correction amount calculated from the compensated temporal characteristic of the shake.

8 Claims, 16 Drawing Sheets

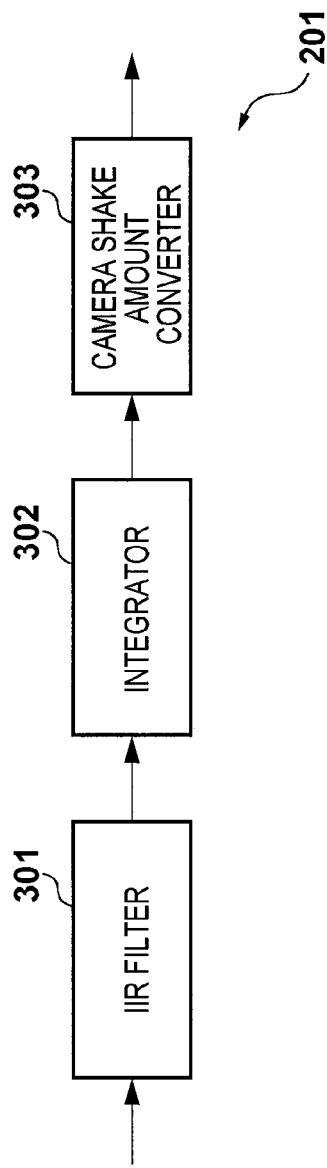
F I G. 3
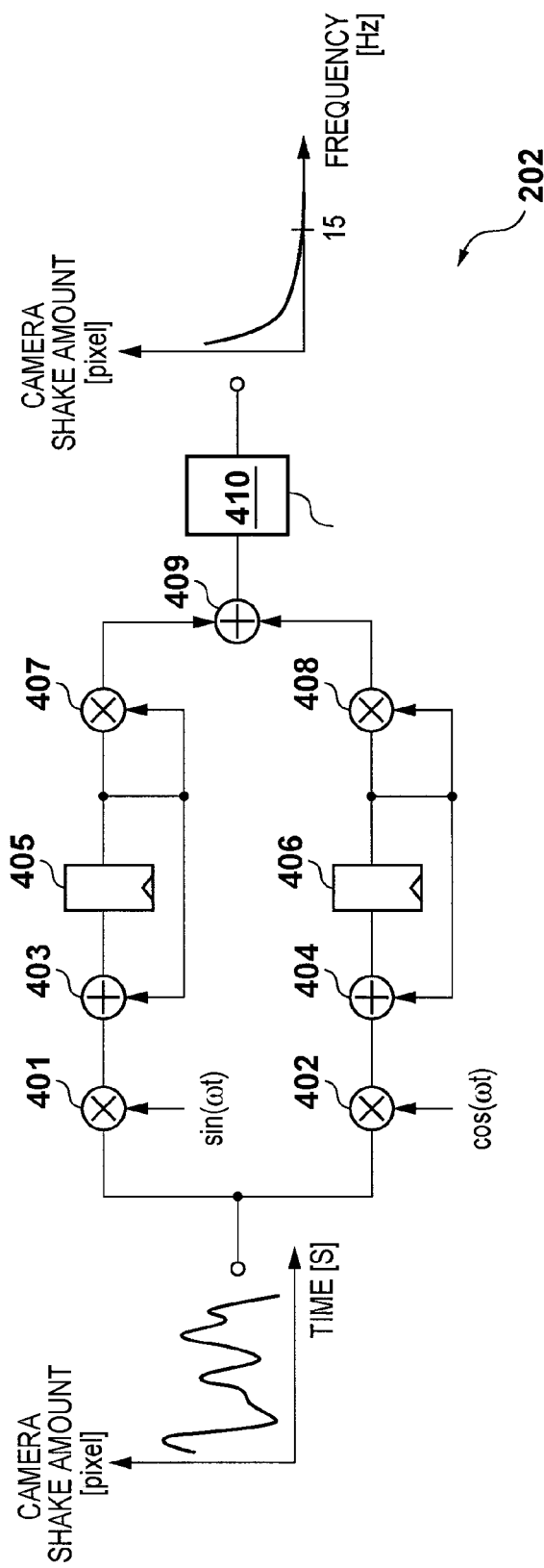
F I G. 4

| AUXILIARY INFORMATION \ DESIGNATED SHOOTING CONDITION | | TWO-HAND-HELD SHOOTING | ONE-HAND-HELD SHOOTING | SHOOTING DURING WALKING |
|---|---|---|---|---|
| GYRO DATA | | SMALL | STANDARD | LARGE |
| FOCAL LENGTH | | TELEPHOTO | MIDDLE | WIDE |
| MAIN OBJECT INFORMATION | SIZE | SMALL | STANDARD | LARGE |
| | DISTANCE | LONG | STANDARD | SHORT |
| SHUTTER SPEED | | SLOW | STANDARD | FAST |

F I G. 12A
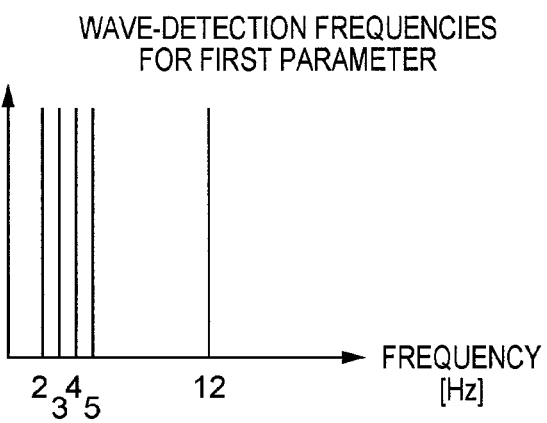
F I G. 12B
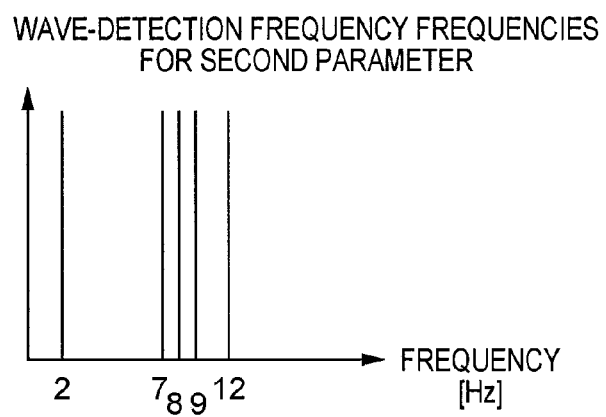
F I G. 12C
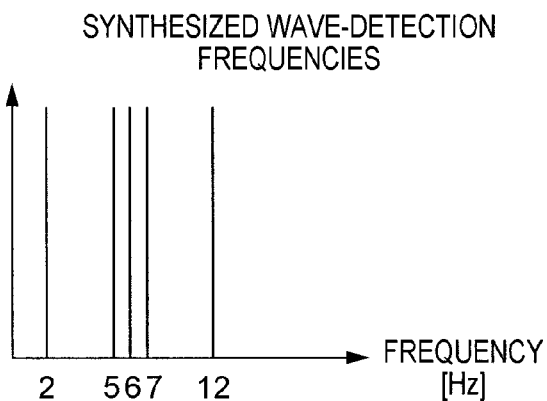

F I G. 13

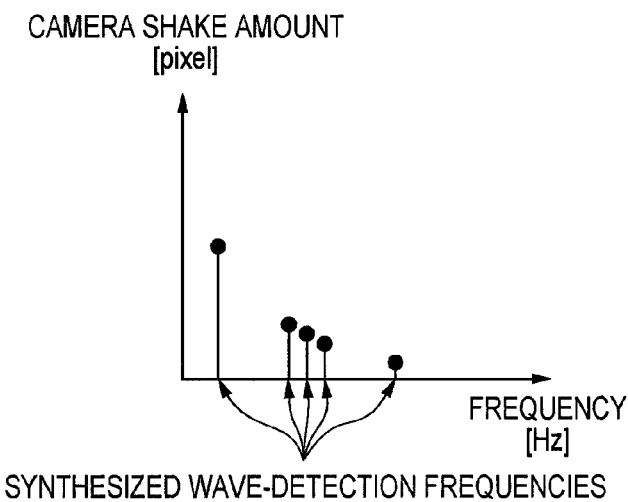

CAMERA SHAKE AMOUNT [pixel]

FREQUENCY [Hz]

SYNTHESIZED WAVE-DETECTION FREQUENCIES

F I G. 14

| AUXILIARY INFORMATION | DESIGNATED SHOOTING CONDITION | TWO-HAND-HELD SHOOTING | ONE-HAND -HELD SHOOTING | SHOOTING DURING WALKING |
|---|---|---|---|---|
| GYRO DATA | | SMALL (0.7) | STANDARD (0.5) | LARGE (0.6) |
| FOCAL LENGTH | | TELEPHOTO (0.7) | MIDDLE (0.5) | WIDE (0.6) |
| MAIN OBJECT INFORMATION | SIZE | SMALL (0.5) | STANDARD (0.4) | LARGE (0.3) |
| | DISTANCE | LONG (0.6) | STANDARD (0.5) | SHORT (0.3) |
| SHUTTER SPEED | | SLOW (0.6) | STANDARD (0.4) | FAST (0.3) |

IMAGE SENSING APPARATUS FOR CORRECTING IMAGE DISTORTION CAUSED BY HAND SHAKE, AND CONTROL METHOD THEREOF

BACKGROUND OF THE INVENTION

1. Field of the Invention

The present invention relates to an image sensing apparatus and control method thereof and, more particularly, to a technique of correcting an image distortion which is caused by hand shake and contained in a sensed image.

2. Description of the Related Art

Recently, image sensing apparatuses such as a digital video camera popularly adopt, as an image sensor, a CMOS sensor lower in power consumption than a CCD sensor. The CCD sensor and CMOS sensor are different not only in power consumption but also in the exposure method in shooting.

In the CCD sensor, the exposure timing and exposure period are the same for all the pixels of the image sensor when sensing one image. To the contrary, in the CMOS sensor, the exposure period changes because the shutter opening/closing timing differs between lines of the image sensor. The driving method of the CMOS sensor is called a rolling shutter method.

Upon shooting with the rolling shutter type image sensor, the sensed image may distort because the object image moves for each line of the image sensor owing to movement of the object during exposure or hand shake of the user who grips the image sensing apparatus during exposure. The phenomenon in which distortion occurs is called the "rolling shutter effect" or "focal-plane effect". Especially, a distortion caused by the rolling shutter effect may appear more conspicuously in moving image shooting using no mechanical shutter than in still image shooting using a mechanical shutter.

Japanese Patent Laid-Open No. 2006-186481 discloses a technique of correcting a distortion caused by hand shake of the user out of distortions arising from the rolling shutter effect. In Japanese Patent Laid-Open No. 2006-186481, the temporal characteristic of hand shake is obtained by integrating a hand shake speed detected by an angular velocity sensor arranged in the image sensing apparatus. The distortion is corrected in accordance with a positional change of the image sensing apparatus in shooting for each line of the image sensor.

However, the sampling frequency of the angular velocity sensor is several kHz to several ten kHz, while the hand shake frequency is about 0 Hz to 15 Hz. These frequencies are greatly different in order. When signal processing is performed using an FIR (Finite Impulse Response) filter described in Japanese Patent Laid-Open No. 2006-186481 to obtain the temporal characteristic of hand shake from the output signal of the angular velocity sensor, many taps are necessary, increasing the circuit scale.

To avoid the increase in circuit scale, not the FIR filter but an IIR (Infinite Impulse Response) filter may be used. However, the IIR filter does not have a linear phase, and a different phase lag or phase lead occurs in each frequency band. The temporal characteristic of hand shake obtained using the IIR filter has a phase shift depending on the phase characteristic of the IIR filter. The correction amount for correcting a distortion caused by the rolling shutter effect may not be accurately calculated for some hand shake frequencies. That is, when a distortion caused by the rolling shutter effect is corrected using a correction amount that is calculated from the temporal characteristic of hand shake obtained using the IIR filter, undercorrection or overcorrection may occur in the image.

SUMMARY OF THE INVENTION

The present invention has been made to solve the conventional drawbacks. The present invention reduces undercorrection or overcorrection when a distortion caused by the rolling shutter effect is corrected.

The present invention in its first aspect provides that an image sensing apparatus including an image sensor driven by a rolling shutter method, comprising: a detection unit configured to detect a shake of the image sensing apparatus in an exposure period of the image sensor when sensing an image using the image sensor; an obtaining unit configured to obtain a temporal characteristic of the shake detected by the detection unit; an analysis unit configured to analyze, for the temporal characteristic of the shake, a frequency distribution of a distortion amount of an object image that is generated in the image owing to the shake; a determination unit configured to determine, as a center frequency of the distortion amount from the frequency distribution of the distortion amount, a frequency at which the distortion amount becomes relatively maximum; a compensation unit configured to compensate for the temporal characteristic of the shake to reduce a phase shift generated by the obtaining unit for at least the center frequency; and a correction unit configured to correct an object image distortion arising from the shake for each line of the image sensor by using a correction amount calculated from the shake compensated for by the compensation unit.

Further features of the present invention will become apparent from the following description of exemplary embodiments (with reference to the attached drawings).

BRIEF DESCRIPTION OF THE DRAWINGS

FIG. 3 is a block diagram showing the arrangement of a camera shake amount calculation unit 201 according to the embodiment of the present invention;

FIG. 4 is a block diagram showing the arrangement of a camera shake amount analysis unit 202 according to the first embodiment of the present invention;

FIGS. 12A, 12B, and 12C are graphs for explaining a method of determining a wave-detection frequency set for wave-detecting the temporal characteristic of hand shake according to the second embodiment, and first and second modifications of the present invention;

FIG. 13 is a graph showing the frequency distribution of wave-detection frequencies with respect to the camera shake amount in the temporal characteristic of hand shake according to the second embodiment, and first and second modifications of the present invention;

FIG. 14 is a table exemplifying the reliability of a shooting condition estimated for each auxiliary information parameter according to the first modification of the present invention;

DESCRIPTION OF THE EMBODIMENTS (First Embodiment)

A preferred embodiment of the present invention will now be described in detail with reference to the accompanying drawings. In the following embodiment, the present invention is applied to a digital video camera serving as an example of an image sensing apparatus capable of correcting a distortion caused by hand shake out of distortions arising from the rolling shutter effect. However, the present invention is applicable to an arbitrary device capable of correcting a distortion caused by hand shake out of distortions arising from the rolling shutter effect. In this specification, a distortion caused by hand shake out of "distortions arising from the rolling shutter effect" will be referred to and explained as a "rolling distortion".

(Functional Arrangement of Digital Video Camera 100)

Figure 1:
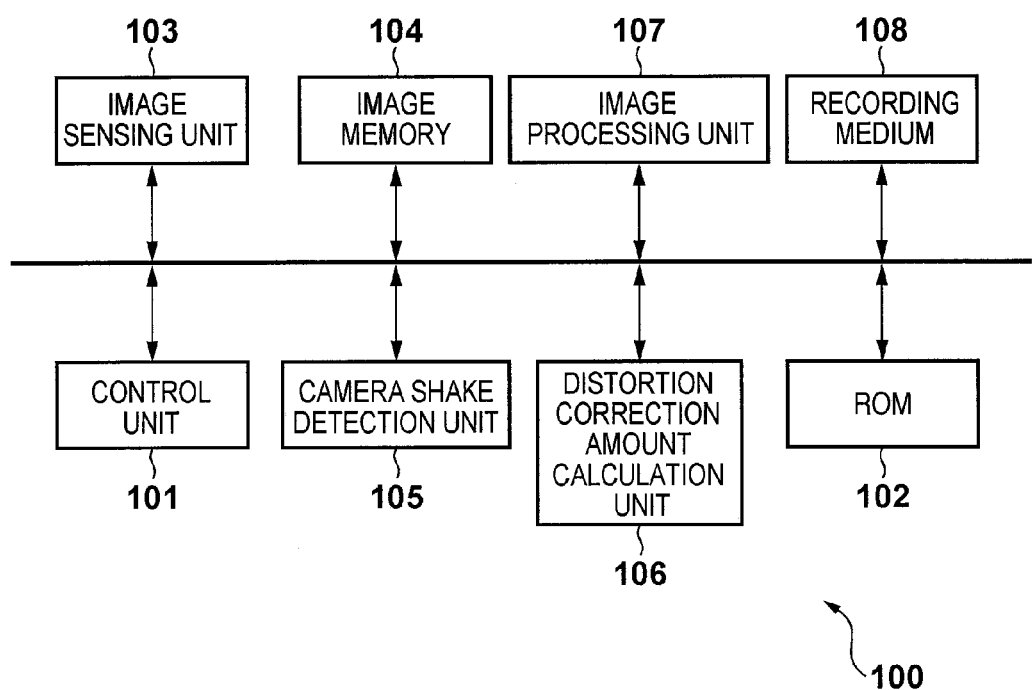
FIG. 1 is a block diagram showing the functional arrangement of a digital video camera according to an embodiment of the present invention.

FIG. 1 is a block diagram showing the functional arrangement of a digital video camera 100 according to the embodiment of the present invention.

A control unit 101 is, for example, a CPU, and controls the operation of each block of the digital video camera 100. For example, the control unit 101 reads out the processing program of shooting processing or the like stored in a ROM 102, expands it in a volatile memory (not shown), and executes it. The ROM 102 is a rewritable nonvolatile memory, and stores parameters and the like necessary for the operation of each block in addition to the above-mentioned processing program.

In this embodiment, each processing is implemented in each block arranged as hardware in the digital video camera 100. However, the practice of the present invention is not limited to this, and processing of each block may be implemented by a program which performs the same processing as that of the block.

An image sensing unit 103 includes a roller shutter type image sensor such as a CMOS sensor. The image sensing unit 103 applies A/D conversion processing to an analog image signal obtained by photoelectrically converting an optical image formed on the image sensor via an optical system (not shown), thereby outputting a digital image signal (image data). For example, an image memory 104 temporarily stores the image data output from the image sensing unit 103.

An image processing unit 107 applies image processes such as gain adjustment and white balance adjustment to the image data which is obtained by the image sensing unit 103 and stored in the image memory 104. By using a distortion correction amount calculated by a distortion correction amount calculation unit 106 (to be described later), the image processing unit 107 corrects, for each line, a rolling distortion that occurs in the image data stored in the image memory 104.

In moving image shooting with the digital video camera 100, the image processing unit 107 encodes, according to a predetermined encoding method, image data having undergone various image processes or rolling distortion correction processing by the image processing unit 107. The encoded moving image data is transmitted to a recording medium 108 and recorded on it.

A camera shake detection unit 105 is, for example, an angular velocity sensor, and detects an angular velocity generated by camera shake (caused by hand shake of the user) applied to the digital video camera 100. The camera shake detection unit 105 outputs the detected angular velocities of three axes of the digital video camera 100 to, for example, the distortion correction amount calculation unit 106. As the detection axes of the camera shake detection unit 105 at this time, the optical axis is defined as the Z-axis, and directions which are perpendicular to the Z-axis and also perpendicular to each other are defined as the X- and Y-axes.

The distortion correction amount calculation unit 106 is a block which calculates a correction amount for correcting a rolling distortion generated in an image within image data due to hand shake. The distortion correction amount calculation unit 106 outputs the calculated correction amount information to the image processing unit 107.

(Internal Arrangement of Distortion Correction Amount Calculation Unit 106)

The Internal arrangement of the distortion correction amount calculation unit 106 and processing to be performed within the distortion correction amount calculation unit 106 will be explained in detail with reference to the drawings.

Figure 2A:
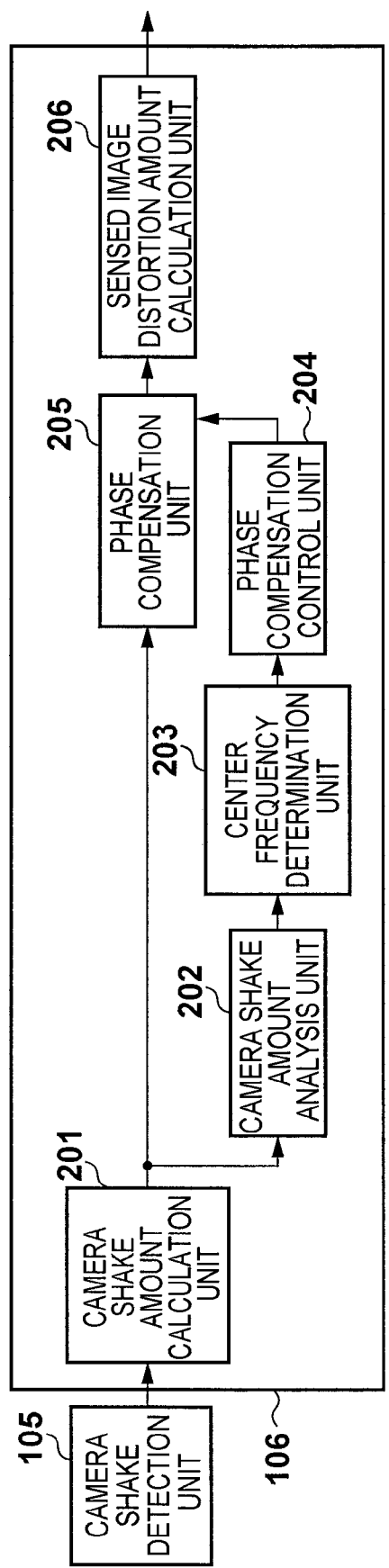
FIGS. 2A, 2B, and 2C are block diagrams each showing the functional arrangement of a distortion correction amount calculation unit 106 according to the embodiment of the present invention.

FIG. 2A is a block diagram showing the internal arrangement of the distortion correction amount calculation unit 106 according to the first embodiment. The distortion correction amount calculation unit 106 receives information of an angular velocity change which has occurred during image sensing of a 1-frame image and is detected by the camera shake detection unit 105.

From the input information of the angular velocity change which has occurred during image sensing of a 1-frame image, a camera shake amount calculation unit 201 obtains the temporal characteristic of the camera shake amount of an image for each pixel on the image sensor upon the angular velocity change.

The camera shake amount calculation unit 201 has an arrangement as shown in FIG. 3. First, an IIR filter 301 performs signal processing for the input angular velocity change information in accordance with the hand shake frequency. Then, an integrator 302 performs integral processing for the angular velocity change information output from the IIR filter 301, outputting the information as hand shake angular displacement information θ. Note that the hand shake angular displacement information θ is output for, for example, angles in the pitch and yaw directions with respect to the image sensing surface of the image sensor in which a rolling distortion may occur.

A camera shake amount converter 303 converts the angular displacement information θ input from the integrator 302 into the camera shake amount of the image for each pixel on the image sensor upon the angular displacement. More specifically, the camera shake amount converter 303 converts the angular displacement information θ into the camera shake amount of the image on the image sensor using the following expression:

$$fL \cdot \tan\theta / p$$

where fL is the focal length, and p is the pixel pitch on the image sensor.

The camera shake amount calculation unit 201 outputs the temporal characteristic of the calculated camera shake amount to a phase compensation unit 205 and camera shake amount analysis unit 202.

Note that the camera shake amount calculation unit 201 generates a phase shift corresponding to the hand shake frequency in the IIR filter 301 and a phase lag of $\pi/2$ caused by integral calculation of the integrator 302. The phase lag by integral calculation of the integrator 302 is a fixed phase shift regardless of the hand shake frequency, and its influence can be eliminated by advancing the phase by $\pi/2$. In this embodiment, to reduce a phase shift corresponding to the hand shake frequency, the center frequency of hand shake is specified from the frequency distribution of hand shake generated during image sensing of one frame. The camera shake amount calculation unit 201 calculates a phase compensation parameter so that the phase shift becomes only $\pi/2$ caused by integral calculation for at least the center frequency in processes of the camera shake amount analysis unit 202, a center frequency determination unit 203, and a phase compensation control unit 204 (to be described later). Then, the camera shake amount calculation unit 201 outputs the phase compensation parameter to the phase compensation unit 205.

The camera shake amount analysis unit 202 analyzes the frequency distribution of hand shake by executing discrete Fourier transform for the input temporal characteristic of hand shake. The discrete Fourier transform in the camera shake amount analysis unit 202 can be executed by hardware having a circuit arrangement as shown in FIG. 4.

Multipliers 401 and 402 multiply the input temporal characteristic of hand shake by the sine wave and cosine wave of a desired frequency, respectively. The results of multiplication by the multipliers 401 and 402 are input to adders 403 and 404, respectively. A shift register 405 delays an input from the adder 403, and outputs it to a multiplier 407 and the adder 403. Similarly, a shift register 406 delays an output from the adder 404, and outputs it to a multiplier 408 and the adder 404. The multipliers 407 and 408 square the outputs from the shift registers 405 and 406, respectively. An adder 409 adds the multiplication results, and a square root calculation unit 410 calculates the square root. In this manner, discrete Fourier transform can be executed by hardware.

The frequency distribution of the camera shake amount analyzed by the camera shake amount analysis unit 202 is output to the center frequency determination unit 203. In general, the frequency distribution of the camera shake amount ranges from 0 to 15 Hz, as shown in FIG. 4. The frequency distribution of the camera shake amount tends to exhibit a larger camera shake amount, that is, hand shake amplitude (maximum camera shake amount) as the frequency becomes lower.

The center frequency determination unit 203 determines the center frequency of hand shake generated during image sensing of one frame from the input frequency distribution of the camera shake amount.

From the frequency distribution of the camera shake amount analyzed by the camera shake amount analysis unit 202, a shake at a single frequency f in the temporal characteristic of hand shake can be expressed using an amplitude A(f) serving as the maximum camera shake amount at this frequency:

$$A(f) \cdot \sin(\omega t) \quad (\omega = 2\pi f)$$

Differentiating the temporal characteristic of hand shake yields a shake speed at each frequency:

$$A(f)\omega \cdot \cos(\omega t)$$

Figure 5A:
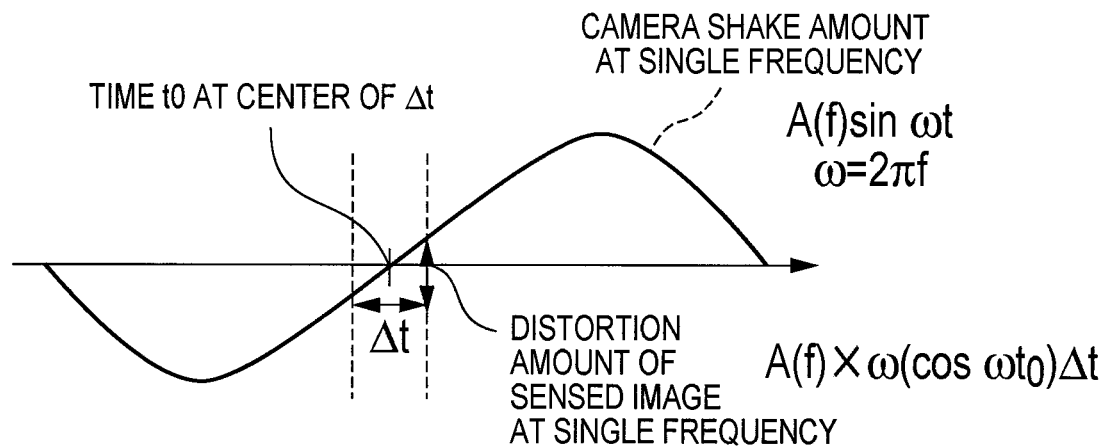
FIGS. 5A, 5B, 5C, and 5D are graphs for explaining a center frequency determination method according to the first embodiment of the present invention.

For example, the exposure start time difference between successive lines of the image sensor is defined as $\Delta t$, and the speed at the center time $t_0$ within $\Delta t$ in FIG. 5A is regarded as the average speed. Then, the image displacement amount in the period $\Delta t$ till the start of image sensing of the next line after the start of image sensing of a given line can be expressed as $$A(f)\omega \cdot \cos(\omega t_0) \cdot \Delta t$$

A(f) (FIG. 5B) already obtained by the camera shake amount analysis unit 202 is separated from this expression, and the expression is approximated for constant $\omega t_0$. Then, the remaining terms can be deformed as $$\omega \cdot \cos(\omega t_0) \cdot \Delta t$$

$$\Rightarrow 2\pi \cdot \cos(\omega t_0) \cdot \Delta t \times f = c \times f \quad (c = const.)$$

Figure 5B:
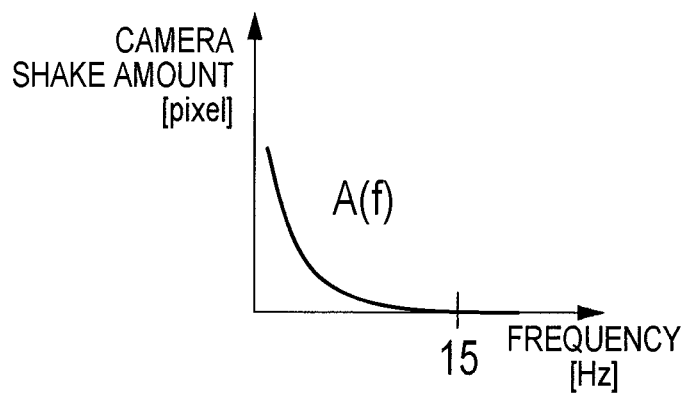
Figure 5C:
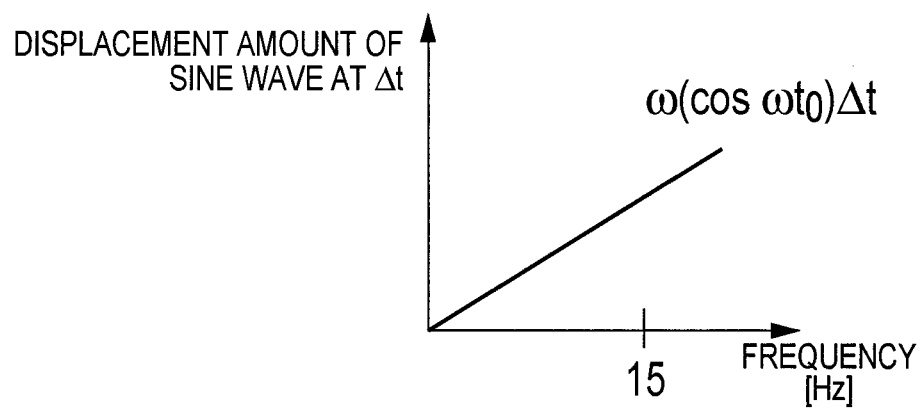

The image displacement amount can be expressed by a linear function with respect to the frequency, as shown in FIG. 5C.

Figure 5D:
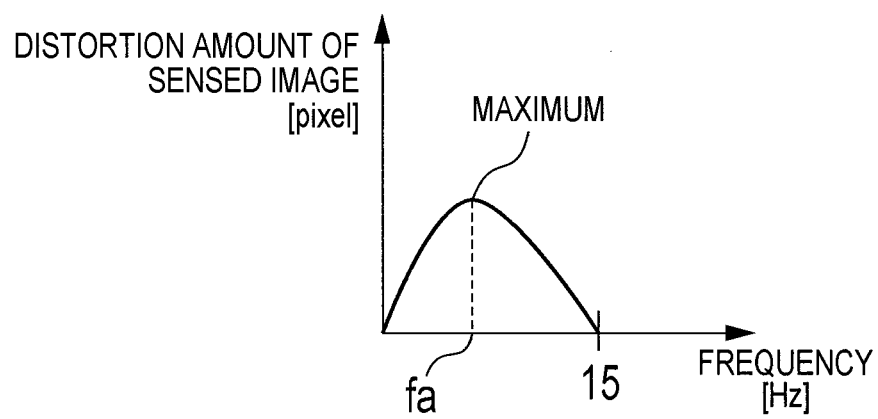

More specifically, the center frequency determination unit 203 multiplies the input frequency distribution of the camera shake amount as shown in FIG. 5B by the linear function as shown in FIG. 5C, thereby obtaining the frequency distribution of the distortion amount in a sensed image as shown in FIG. 5D.

In this embodiment, a frequency fa at which the camera shake amount becomes maximum in the frequency distribution of the distortion amount in a sensed image is determined as the center frequency. The phase compensation parameter is set in the phase compensation control unit 204 (to be described later) so that a phase lag caused by the IIR filter 301 becomes $\pi/2$ at the center frequency. With this setting, a distortion can be eliminated at a frequency (center frequency) at which the distortion amount is maximum, that is, a distortion by undercorrection or overcorrection of the image readily stands out when a phase shift occurs.

The phase compensation control unit 204 calculates a phase compensation parameter so that a phase lag near the center frequency determined by the center frequency determination unit 203 becomes $\pi/2$ in phase compensation processing for the temporal characteristic of hand shake by the phase compensation unit 205. The phase compensation control unit 204 outputs the phase compensation parameter to the phase compensation unit 205. Note that the phase compensation parameter is determined by a known method so that the phase of the camera shake amount after phase compensation becomes a target phase of $-\pi/2$ in a frequency band near the center frequency.

Figure 7A:
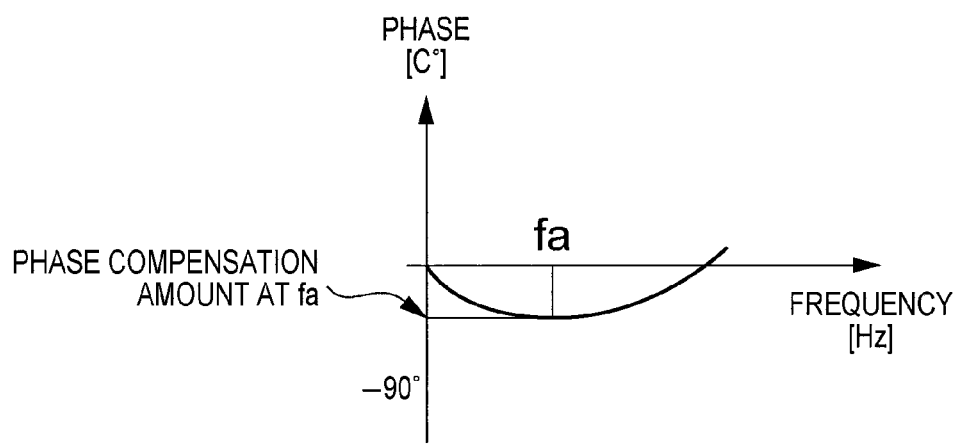
FIGS. 7A and 7B are graphs for explaining phase compensation according to the embodiment of the present invention.

The phase compensation unit 205 is a phase compensation filter, and this phase compensation filter has a phase characteristic as shown in FIG. 7A. The phase compensation unit 205 compensates for a phase shift of the input temporal characteristic of hand shake that is generated by the IIR filter 301 at the center frequency determined by the center frequency determination unit 203. The phase compensation unit 205 compensates for the phase so that a phase lag at the center frequency determined by the center frequency determination unit 203 becomes π/2 generated in the integrator 302.

Figure 6:
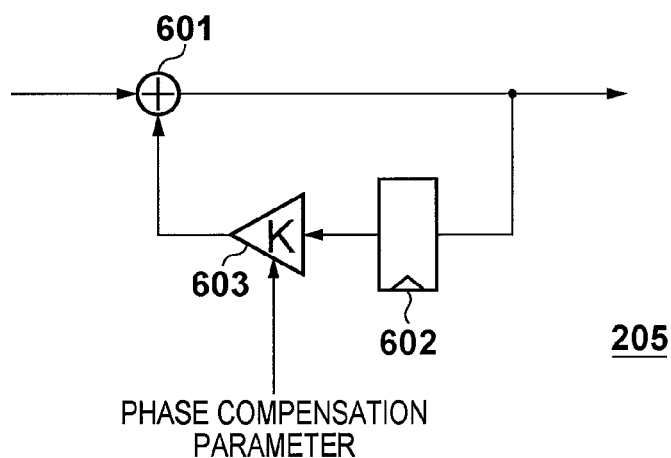
FIG. 6 is a circuit diagram showing the arrangement of a phase compensation unit 205 according to the embodiment of the present invention.

The phase compensation unit 205 has an internal arrangement as shown in FIG. 6. An adder 601 adds the input temporal characteristic (camera shake amount) of hand shake and an output from an amplifier 603 (to be described below), and outputs the phase-compensated camera shake amount to a sensed image distortion amount calculation unit 206. A shift register 602 delays the input phase-compensated camera shake amount, and outputs it to the amplifier 603. The amplifier 603 multiplies an output from the shift register 602 by a filter coefficient K serving as the phase compensation parameter input from the phase compensation control unit 204. The amplifier 603 outputs the product to the adder 601.

Figure 7B:
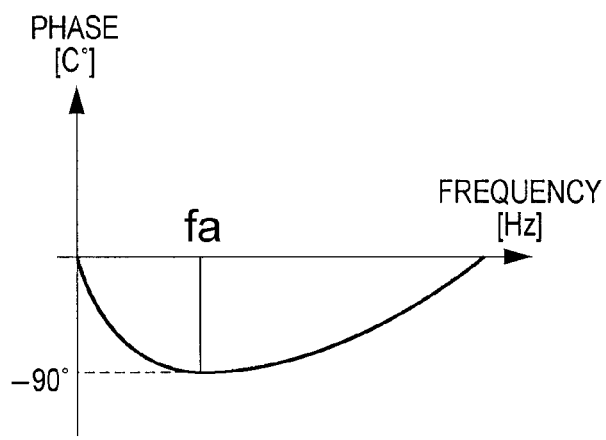

With this arrangement, the phase characteristic of the camera shake amount output from the phase compensation unit 205 can be adjusted to −π/2 at the center frequency as shown in FIG. 7B by using the phase compensation parameter appropriately set by the phase compensation control unit 204.

Figure 8:
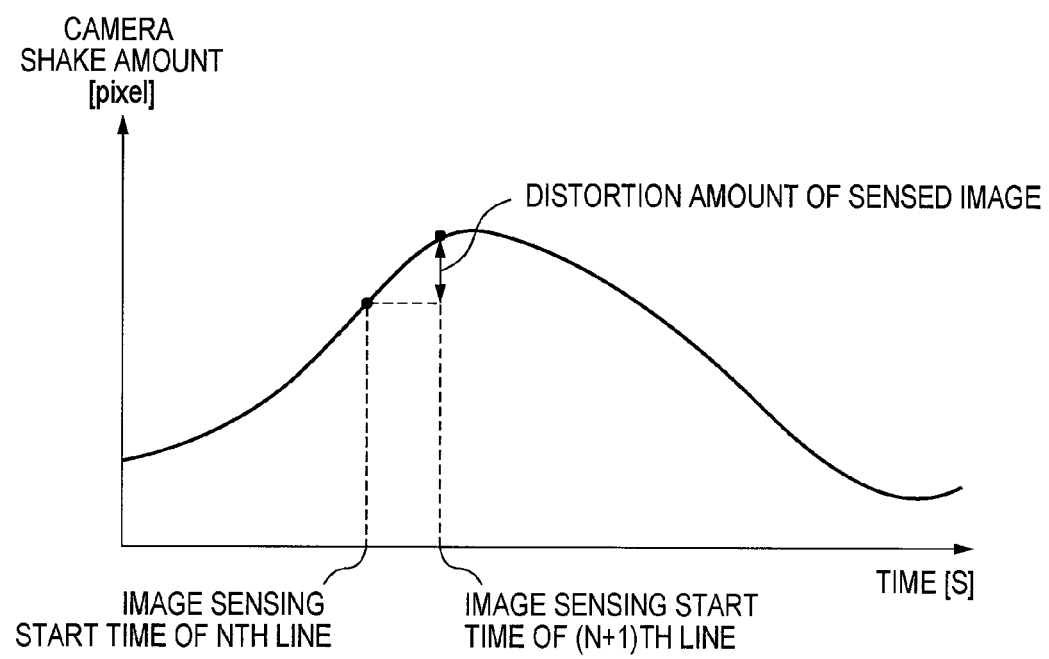
FIG. 8 is a graph for explaining a sensed image correction amount calculation method according to the embodiment of the present invention.

By using the input phase-compensated temporal characteristic of hand shake, the sensed image distortion amount calculation unit 206 calculates the amount of a sensed image distortion caused by the rolling shutter effect for each line of the image sensor in which a phase shift generated in the camera shake amount calculation unit 201 is compensated for. When a distortion amount generated between the Nth line and (N+1)th line is exemplified, the sensed image distortion amount between these lines of the image sensor can be calculated from a camera shake amount difference at the exposure start time, as shown in FIG. 8.

The image processing unit 107 can correct a sensed image distortion caused by the rolling shutter effect for each line of the image sensor by using the correction amount determined to eliminate the calculated distortion amount.

(Second Embodiment)

The first embodiment has described a method of determining the center frequency by analyzing the frequency distribution of the camera shake amount at all the frequencies of the temporal characteristic of hand shake. The second embodiment will explain a method of determining the center frequency by analyzing the frequency distribution of the camera shake amount for limited frequencies.

(Internal Arrangement of Distortion Correction Amount Calculation Unit 106)

Figure 2B:
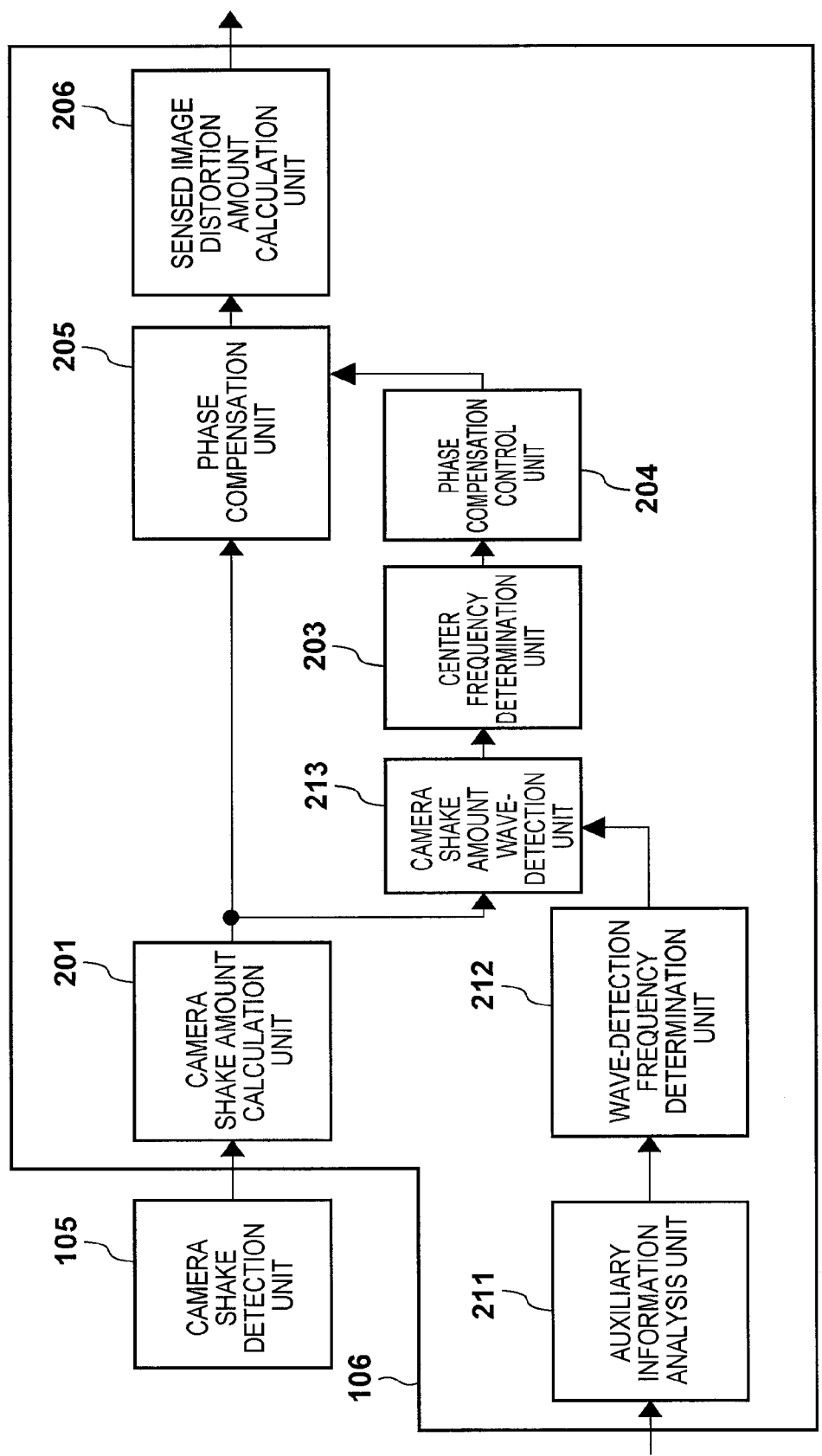

FIG. 2B is a block diagram showing the internal arrangement of a distortion correction amount calculation unit 106 according to the second embodiment. In the distortion correction amount calculation unit 106 of the second embodiment, the same reference numerals as those in the first embodiment denote the same parts, and a description thereof will not be repeated. Only a characteristic arrangement or processing of the second embodiment will be explained.

The distortion correction amount calculation unit 106 in the second embodiment receives information of an angular velocity change which has occurred during image sensing of a 1-frame image and is detected by a camera shake detection unit 105. In addition, the distortion correction amount calculation unit 106 receives, from a control unit 101, auxiliary information representing the state of a digital video camera 100 in sensing this image. The auxiliary information is information such as the maximum acceleration (gyro data) of a gyro sensor (not shown), focal length, main object information, or shutter speed. In this embodiment, the auxiliary information is input to an auxiliary information analysis unit 211.

Figures 9A, 9B:
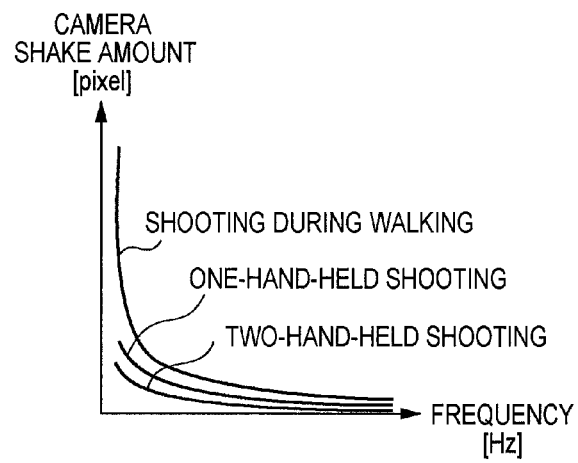
FIGS. 9A and 9B are a graph and table, respectively, for explaining a shooting condition estimation method according to the second embodiment, and first and second modifications of the present invention.

Based on the input auxiliary information, the auxiliary information analysis unit 211 estimates which of two-hand-held shooting, one-hand-held shooting, and shooting during walking is the shooting condition of the digital video camera 100. In general, the frequency distribution of hand shake generated in the digital video camera 100 differs between these shooting conditions depending on the gripping or moving state of the user, as shown in FIG. 9A. More specifically, in shooting during walking in which the user shoots while moving, the camera shake amount upon hand shake is considered to become relatively large. To the contrary, in two-hand-held shooting in which the user holds the digital video camera 100 two-handed without moving, the camera shake amount upon hand shake is considered to become relatively small.

As for gyro data, for example, one low frequency of about 2 to 3 Hz is wave-detected, and the camera shake amount at the frequency is classified into one of "large", "standard", and "small" using a threshold. The auxiliary information analysis unit 211 estimates that the shooting condition is "shooting during walking" when the camera shake amount is large, and that the shooting condition is "two-hand-held shooting" when it is small.

As for the focal length, as the zoom position comes closer to the telephoto end, hand shake more readily appears as an image distortion. It is therefore considered that the user will shoot with the digital video camera 100 fixed firmly. From this, the auxiliary information analysis unit 211 estimates that the shooting condition is "two-hand-held shooting" when the focal length is long, and that the shooting condition is "shooting during walking" when it is short.

As for main object information, it is considered that shooting is performed at a zoom position close to the telephoto end when the main object size is small in a sensed image at a zoom position close to the wide-angle end, or the distance to the main object is long. The auxiliary information analysis unit 211 estimates that the shooting condition is "two-hand-held shooting" when the main object size is small or the distance to the main object is long, and that the shooting condition is "shooting during walking" when the main object size is large or the distance to the main object is short.

As for the shutter speed, when the exposure time is long, the influence of accumulated camera shake becomes significant and a sensed image distortion caused by low-frequency camera shake is regarded to hardly stand out. The auxiliary information analysis unit 211 estimates that the shooting condition is "two-hand-held shooting" in which the camera shake amount of a low frequency component is small when the shutter speed is low. Then, the phase compensation frequency is adjusted to come close to the high frequency side.

More specifically, the auxiliary information analysis unit 211 classifies the parameters of pieces of input auxiliary information using a predetermined state and threshold, as shown in FIG. 9B, and estimates a shooting condition for each parameter of auxiliary information. With this setting, a wave-detection frequency determination unit 212 (to be described later) can determine a frequency to be wave-detected to determine the center frequency of the temporal characteristic of actual hand shake from the frequency distribution of a general camera shake amount.

Figure 10:
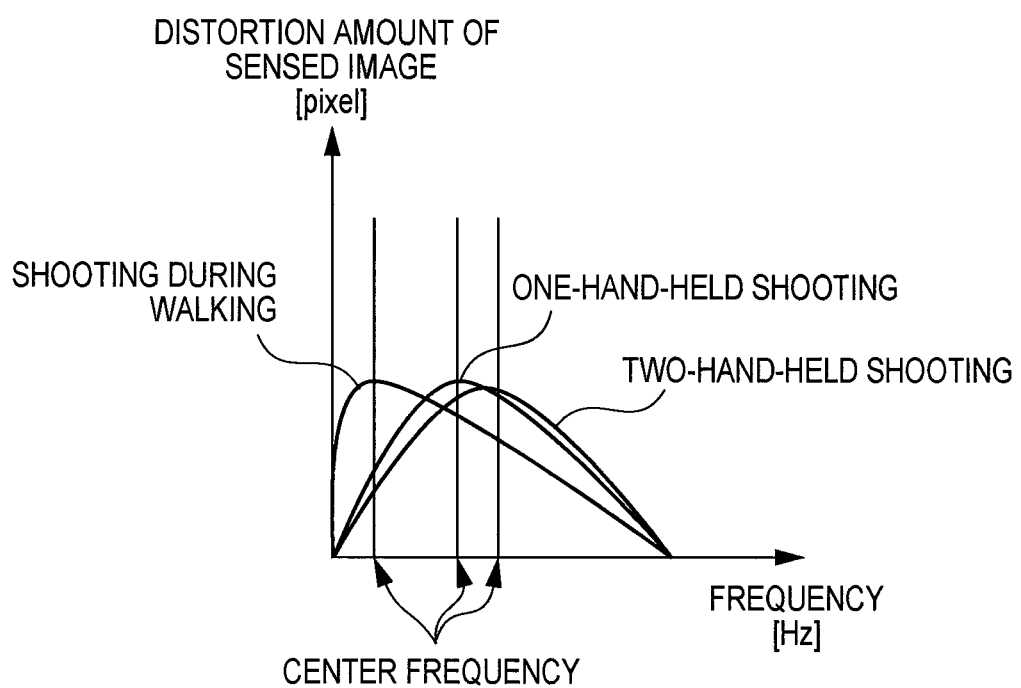
FIG. 10 is a graph exemplifying the general center frequency of the distortion amount in an estimated shooting condition according to the second embodiment, and first and second modifications of the present invention.

The wave-detection frequency determination unit 212 determines a frequency (wave-detection frequency) for wave-detecting the frequency distribution of the camera shake amount for the temporal characteristic of actual hand shake from the shooting condition of each parameter of auxiliary information that has been estimated by the auxiliary information analysis unit 211 (first selection). Considering the frequency distribution of the distortion amount in a sensed image, the center frequency has, for example, a tendency as shown in FIG. 10 for each shooting condition. Based on this tendency, the center frequency of the temporal characteristic of actual hand shake can be estimated. In other words, it is considered that an actual center frequency can be easily specified by wave-detecting the frequency distribution of the camera shake amount in the temporal characteristic of actual hand shake mainly at frequencies near the estimated center frequency.

Figure 11A:
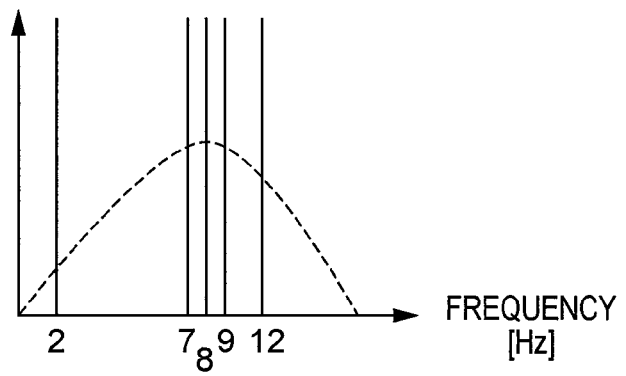
FIGS. 11A, 11B, and 11C are graphs each exemplifying a wave-detection frequency set for an estimated shooting condition according to the second embodiment and second modification of the present invention.
Figure 11B:
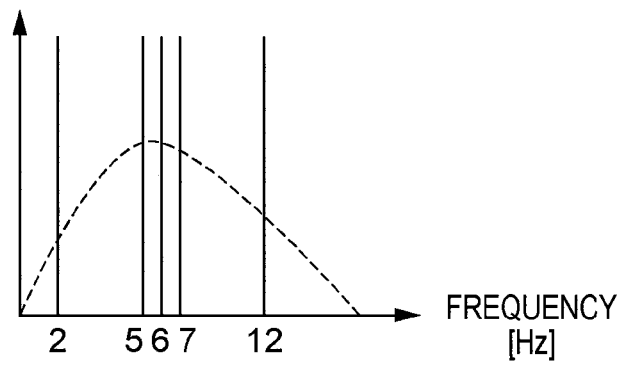
Figure 11C:
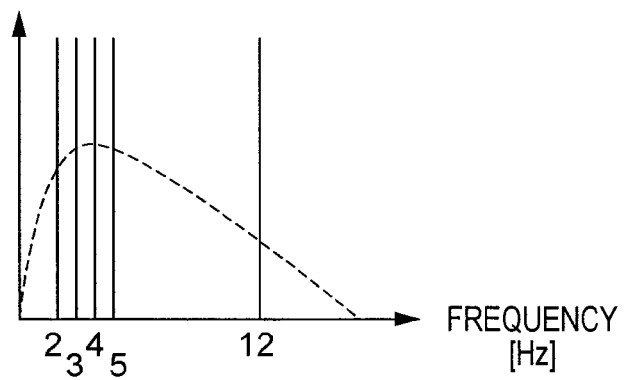

The wave-detection frequency determination unit 212 discretely selects wave-detection frequencies for each parameter of auxiliary information. More specifically, the wave-detection frequency determination unit 212 selects, for each parameter, a discrete wave-detection frequency set preset based on the center frequency of the frequency distribution of a general camera shake amount as shown in FIG. 11A, 11B, or 11C in correspondence with a shooting condition estimated for each parameter of the auxiliary information.

Then, the wave-detection frequency determination unit 212 combines discrete wave-detection frequency sets selected for respective parameters of the auxiliary information, determining a final wave-detection frequency set for wave-detecting the temporal characteristic of actual hand shake in a camera shake amount wave-detection unit 213 (to be described later).

For example, a case in which a final wave-detection frequency set is determined using two parameters of auxiliary information will be examined. When a wave-detection frequency set in FIG. 12A is selected for one parameter and a wave-detection frequency set in FIG. 12B is selected for the other parameter, the final wave-detection frequency set is obtained by averaging the first frequencies to fifth frequencies respectively:

first frequency: (2+2)/2=2 Hz
second frequency: (3+7)/2=5 Hz
third frequency: (4+8)/2=6 Hz
fourth frequency: (5+9)/2=7 Hz
fifth frequency: (12+12)/2=12 Hz (the final wave-detection frequency set is shown in FIG. 12C).

The frequency distribution of the camera shake amount is wave-detected from the temporal characteristic of actual hand shake at discretely determined frequencies. The load of this processing can be reduced, compared to analysis (wave-detection) of the frequency distribution of the camera shake amount at all frequencies.

As for the input temporal characteristic of hand shake, the camera shake amount wave-detection unit 213 performs discrete Fourier transform for frequencies contained in the wave-detection frequency set determined by the wave-detection frequency determination unit 212, obtaining the frequency distribution of the camera shake amount at the respective frequencies. The obtained frequency distribution of the camera shake amount is discrete as shown in FIG. 13. The center frequency determination unit 203 multiplies this frequency distribution by $2\pi \cdot \cos(\omega t_0) \cdot \Delta t$, determining a frequency indicating a relative maximum distortion amount as the center frequency.

As described above, the image sensing apparatus according to this embodiment estimates the shooting condition and determines the wave-detection frequency, thereby simplifying processing of calculating the center frequency of the temporal characteristic of hand shake. By using the obtained center frequency, a phase shift generated by using the IIR filter can be compensated for at a frequency at which a distortion caused by undercorrection or overcorrection readily stands out, similar to the first embodiment.

(First Modification)

In the second embodiment, the wave-detection frequency determination unit 212 averages fixed wave-detection frequency sets selected for respective parameters of auxiliary information, determining a wave-detection frequency set for wave-detecting the temporal characteristic of actual hand shake. The first modification will explain a method of setting reliability for a shooting condition estimated for each parameter of auxiliary information, and determining a wave-detection frequency set based on the reliability of the center frequency of each shooting condition.

For example, a case in which estimation reliability as shown in FIG. 14 is set for a shooting condition estimated for each parameter of auxiliary information will be examined. The wave-detection frequency determination unit 212 selects a predetermined center frequency as shown in FIG. 10 for a shooting condition estimated by the auxiliary information analysis unit 211 for each parameter of auxiliary information, and selects a wave-detection frequency set centered on this center frequency.

Figure 15A:
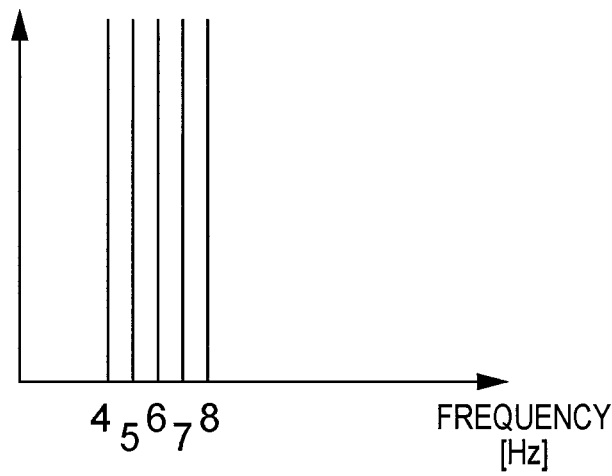
FIGS. 15A and 15B are graphs for explaining a method of selecting a wave-detection frequency corresponding to shooting condition reliability according to the first modification of the present invention.
Figure 15B:
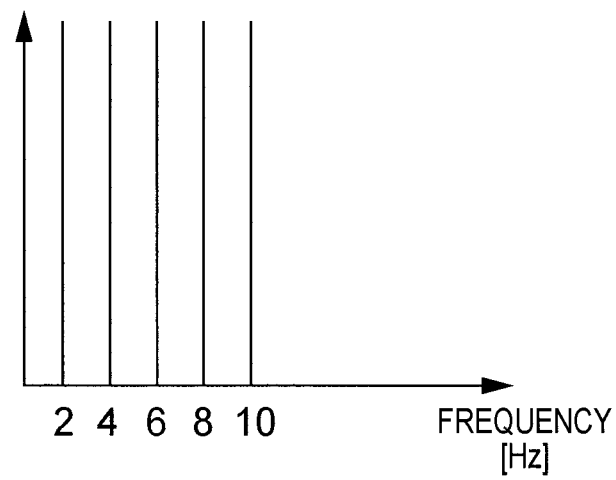

Assume that, when the reliability of the estimated shooting condition is 1, a wave-detection frequency set centered on a center frequency of 6 Hz includes frequencies of 4, 5, 6, 7, and 8 Hz at an interval of 1 Hz, as shown in FIG. 15A. When the reliability of a shooting condition estimated for one parameter of auxiliary information is 0.5, the wave-detection frequency determination unit 212 selects a wave-detection frequency set so that the interval of the wave-detection frequency set becomes the reciprocal of the shooting condition reliability, that is, double, compared to a wave-detection frequency set for reliability 1. That is, for this parameter, the wave-detection frequency determination unit 212 selects a wave-detection frequency set as shown in FIG. 15B in which the interval of a frequency to be wave-detected is as double as 2 Hz using the 6-Hz center frequency of the estimated shooting condition as the center.

The wave-detection frequency determination unit 212 averages wave-detection frequency sets selected based on the reliabilities of shooting conditions for respective parameters of auxiliary information, thereby determining a final wave-detection frequency set for wave-detecting the temporal characteristic of actual hand shake.

In this fashion, the estimation reliability is used when estimating a shooting condition in accordance with the state of the digital video camera 100 in shooting that is used as auxiliary information. The temporal characteristic of hand shake can be wave-detected using a wave-detection frequency flexibly coping with the shooting state.

In the description of this modification, the wave-detection frequency set is selected using the center frequency as the center so that the frequency interval becomes the reciprocal of the reliability. However, the practice of the present invention is not limited to this. For example, the frequency interval may be determined in advance for each reliability or may change depending on the center frequency. Further, the frequency interval in a wave-detection frequency set need not be equal.

(Second Modification)

In the first embodiment and the first modification, wave-detection is performed for a wave-detection frequency set determined by the wave-detection frequency determination unit 212. A frequency indicating a relative maximum distortion amount in the wave-detection frequency set is determined as the center frequency for the temporal characteristic of hand shake. The second modification will explain a method of determining a more accurate center frequency by feeding back the frequency distribution of the distortion amount as a result of wave-detecting the temporal characteristic of hand shake at wave-detection frequencies.

(Internal Arrangement of Distortion Correction Amount Calculation Unit 106)

Figure 2C:
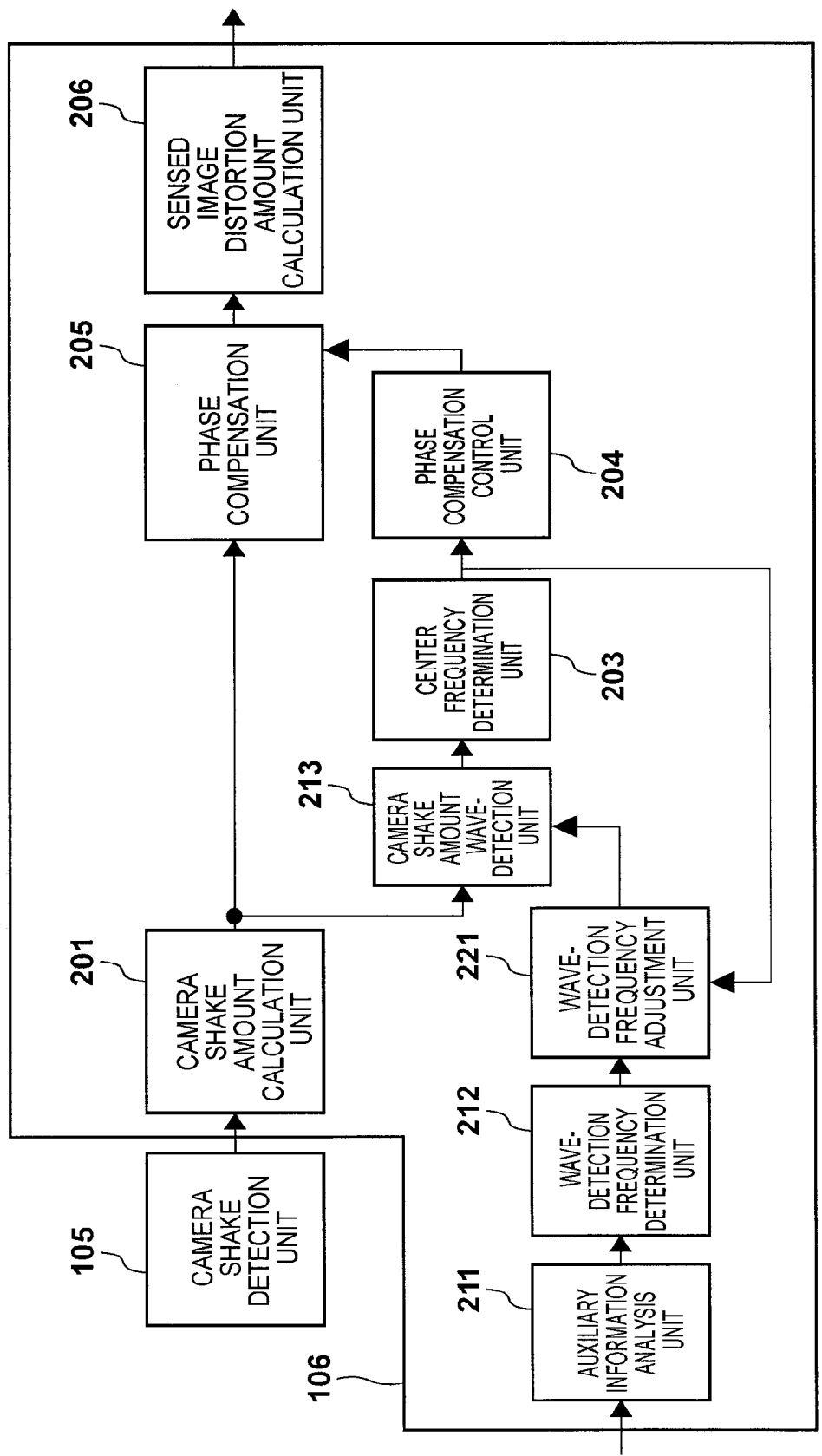

FIG. 2C is a block diagram showing the internal arrangement of the distortion correction amount calculation unit 106 according to this modification. In the distortion correction amount calculation unit 106 of this modification, the same reference numerals as those in the first and second embodiments denote the same parts, and a description thereof will not be repeated. Only a characteristic arrangement or processing of this modification will be explained.

A wave-detection frequency adjustment unit 221 is a block which controls a wave-detection frequency set used for wave-detection by the camera shake amount wave-detection unit 213, based on the frequency distribution of the distortion amount as a result of wave-detecting the temporal characteristic of hand shake that is obtained by the center frequency determination unit 203.

Figure 16A:
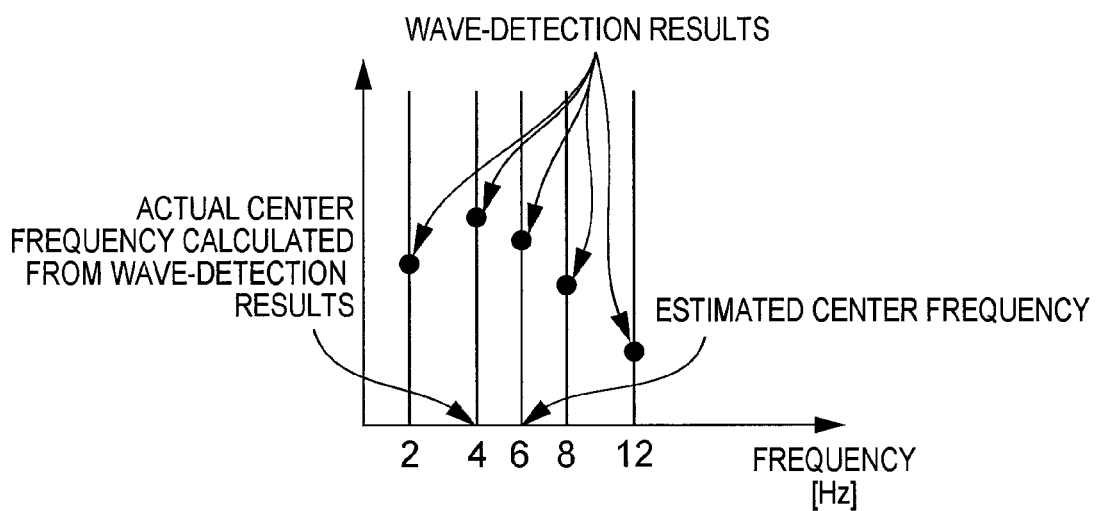
FIGS. 16A and 16B are graphs for explaining a wave-detection frequency determination method according to the second modification of the present invention.

For example, a case in which the center frequency determination unit 203 multiplies the frequency distribution of the camera shake amount including wave-detection frequencies by $2\pi \cdot \cos(\omega t_0) \cdot \Delta t$, obtaining the frequency distribution of the distortion amount in a sensed image, as shown in FIG. 16A, will be examined. In the frequency distribution, a frequency having a relative maximum distortion amount is 4 Hz, and the distortion amount decreases at frequencies of 2 Hz and 6 Hz which sandwich the frequency of 4 Hz. Hence, an accurate center frequency of the temporal characteristic of hand shake is considered to exist in the frequency band of 2 to 6 Hz.

Figure 16B:
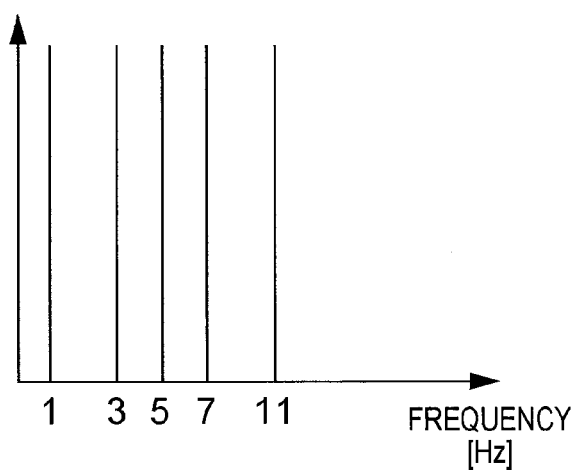

Upon receiving the frequency distribution result from the center frequency determination unit 203, the wave-detection frequency adjustment unit 221 determines the above-mentioned tendency, and changes the wave-detection frequency set which has been input from the wave-detection frequency determination unit 212 and output once to the camera shake amount wave-detection unit 213. For example, when a frequency distribution result as shown in FIG. 16A is obtained, the wave-detection frequency adjustment unit 221 shifts the center frequency among wave-detection frequencies and sets a new wave-detection frequency set (second selection), as shown in FIG. 16B. Then, the wave-detection frequency adjustment unit 221 outputs the new wave-detection frequency set to the camera shake amount wave-detection unit 213.

The center frequency determination unit 203 can determine the center frequency using a plurality of wave-detection results, further increasing the compensation precision of a phase shift generated by the IIR filter 301.

Note that the first and second modifications have been described as separate modifications, but it will readily occur to those skilled in the art that these modifications can be combined.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-062925, filed Mar. 22, 2011, which is hereby incorporated by reference herein in its entirety.

What is claimed is:

1. An image sensing apparatus including an image sensor driven by a rolling shutter method, comprising:
    a detection unit configured to detect a shake of the image sensing apparatus in an exposure period of the image sensor when sensing an image using the image sensor;
    an obtaining unit configured to obtain a temporal characteristic of the shake detected by said detection unit;
    an analysis unit configured to analyze, for the temporal characteristic of the shake, a frequency distribution of a distortion amount of an object image that is generated in the image owing to the shake;
    a determination unit configured to determine, as a center frequency of the distortion amount from the frequency distribution of the distortion amount, a frequency at which the distortion amount becomes relatively maximum;
    a compensation unit configured to compensate for the temporal characteristic of the shake to reduce a phase shift generated by said obtaining unit for at least the center frequency; and
    a correction unit configured to correct an object image distortion arising from the shake for each line of the image sensor by using a correction amount calculated from the shake compensated for by said compensation unit.

2. An image sensing apparatus including an image sensor driven by a rolling shutter method, comprising:
    a detection unit configured to detect a shake of the image sensing apparatus in an exposure period of the image sensor when sensing an image using the image sensor;
    an obtaining unit configured to obtain a temporal characteristic of the shake detected by said detection unit;
    a first selection unit configured to select, as wave-detection frequencies based on a parameter of the image sensing apparatus when sensing the image, a plurality of frequencies including a frequency band estimated to include a center frequency of a distortion amount of an object image that is generated in the image owing to the shake;
    an analysis unit configured to analyze, for the temporal characteristic of the shake, a frequency distribution of the distortion amount of the object image that is generated in the image owing to the wave-detection frequencies in the shake;
    a determination unit configured to determine, as a center frequency of the distortion amount from the frequency distribution of the distortion amount, a frequency at which the distortion amount becomes relatively maximum;
    a compensation unit configured to compensate for the temporal characteristic of the shake to reduce a phase shift generated by said obtaining unit for at least the center frequency; and
    a correction unit configured to correct an object image distortion arising from the shake for each line of the image sensor by using a correction amount calculated from the shake compensated for by said compensation unit.

3. The apparatus according to claim 2, further comprising a second selection unit configured to select new wave-detection frequencies different from the wave-detection frequencies based on the frequency distribution of the distortion amount that has been analyzed by said analysis unit, wherein said analysis unit analyzes, for the temporal characteristic of the shake, a frequency distribution of the distortion amount of the object image that is generated in the image owing to the new wave-detection frequencies in the shake, and said determination unit determines the center frequency using the frequency distribution of the distortion amount including the wave-detection frequencies and the frequency distribution of the distortion amount including the new wave-detection frequencies.

4. The apparatus according to claim 2, wherein the parameter in image sensing is at least one of shake, focal length, main object information, and shutter speed in image sensing, and said first selection unit estimates, based on the parameter in image sensing, a shooting condition of the image sensing apparatus when sensing the image, and selects the wave-detection frequencies using frequencies determined in advance for each estimated shooting condition.

5. The apparatus according to claim 4, wherein said first selection unit selects the wave-detection frequencies based on the frequencies determined in advance for each estimated shooting condition and estimation reliability of the shooting condition.

6. The apparatus according to claim 1, wherein said analysis unit analyzes the frequency distribution of the distortion amount of the object image that is generated in the image owing to the shake between successive lines of the image sensor in a period till a start of exposure of a next line after a start of exposure of a given line.

7. A method of controlling an image sensing apparatus including an image sensor driven by a rolling shutter method, comprising:

a detection step of detecting a shake of the image sensing apparatus in an exposure period of the image sensor when sensing an image using the image sensor;

an obtaining step of obtaining a temporal characteristic of the shake detected in the detection step;

an analysis step of analyzing, for the temporal characteristic of the shake, a frequency distribution of a distortion amount of an object image that is generated in the image owing to the shake;

a determination step of determining, as a center frequency of the distortion amount from the frequency distribution of the distortion amount, a frequency at which the distortion amount becomes relatively maximum;

a compensation step of compensating for the temporal characteristic of the shake to reduce a phase shift generated in the obtaining step for at least the center frequency; and a correction step of correcting an object image distortion arising from the shake for each line of the image sensor by using a correction amount calculated from the shake compensated for in the compensation step.

8. A method of controlling an image sensing apparatus including an image sensor driven by a rolling shutter method, comprising:

a detection step of detecting a shake of the image sensing apparatus in an exposure period of the image sensor when sensing an image using the image sensor;

an obtaining step of obtaining a temporal characteristic of the shake detected in the detection step;

a first selection step of selecting, as wave-detection frequencies based on a parameter when sensing the image, a plurality of frequencies including a frequency band estimated to include a center frequency of a distortion amount of an object image that is generated in the image owing to the shake;

an analysis step of analyzing, for the temporal characteristic of the shake, a frequency distribution of the distortion amount of the object image that is generated in the image owing to the wave-detection frequencies in the shake;

a determination step of determining, as a center frequency of the distortion amount from the frequency distribution of the distortion amount, a frequency at which the distortion amount becomes relatively maximum;

a compensation step of compensating for the temporal characteristic of the shake to reduce a phase shift generated in the obtaining step for at least the center frequency; and a correction step of correcting an object image distortion arising from the shake for each line of the image sensor by using a correction amount calculated from the shake compensated for in the compensation step.

* * * * *